United States Patent [19]
Mottate

[11] Patent Number: 4,504,097
[45] Date of Patent: Mar. 12, 1985

[54] RETURN HOLE OF A ROLLER BEARING FOR ENDLESS LINEAR MOTION

[75] Inventor: Tatsuo Mottate, Mitaka, Japan

[73] Assignee: Nippon Thompson Co. Ltd., Tokyo, Japan

[21] Appl. No.: 543,322

[22] Filed: Oct. 19, 1983

[30] Foreign Application Priority Data

Mar. 15, 1983 [JP] Japan .............................. 58-38164[U]

[51] Int. Cl.³ .......................................... F16C 29/06
[52] U.S. Cl. .................................... 308/6 C; 308/5 R
[58] Field of Search .............. 308/6 C, 3.5, 6 R, 6 A, 308/5 R; 464/168

[56] References Cited

U.S. PATENT DOCUMENTS

| | | | |
|---|---|---|---|
| 3,393,020 | 7/1968 | Pitner | 464/168 |
| 3,752,541 | 8/1973 | McVey | 308/6 C |
| 3,920,289 | 11/1975 | Demay | 308/6 C |
| 4,302,059 | 11/1981 | Teramachi | 308/6 C |

Primary Examiner—Lenard A. Footland
Attorney, Agent, or Firm—L. Lawton Rogers, III

[57] ABSTRACT

In a roller bearing for endless linear motion, a return hole is provided in which its cross section is of a composite shape formed by a basic circular hole and a square section concentric thereto. As a result, various advantages such as less resistance to rollers rolling inside said return hole, accurate guiding surfaces for rollers, good lubrication and cooling in said return hole, less wear, and low cost manufacturing are achieved.

10 Claims, 11 Drawing Figures

D/L
1.000
1.036
1.071
1.167
1.143
1.179
1.214
1.256
1.286
1.321
1.357
1.393
1.429
1.464

RETURN HOLE OF A ROLLER BEARING FOR ENDLESS LINEAR MOTION

BACKGROUND OF THE INVENTION (1) Field of the Invention

The present invention relates to an improved return hole of a circulating path for rollers of a roller bearing for endless linear motion where a casing mounted on a track rail can make endless linear motion through a plurality of rollers circulating endlessly in said circulating path. The purpose of the present invention is to provide a return which is easy to manufacture, and which will produce various effects such as improved lubrication and cooling of the rollers, improved exhaust of foreign matters in the circulating path.

As shown in FIGS. 5 and 6, a roller bearing for endless linear motion consists of a track rail 1 of a linear shape and a casing 2 which mounts on said track rail 1, said casing 2 being able to make an endless linear motion through a plurality of rollers 3 circulating endlessly inside said casing 2. A circulating path for endlessly circulating said roller 3 comprises a load zone and a no load zone, said load zone consisting of a load track 6 formed by a right angle V groove 4 on said casing 2 and a right angle V groove 5 on said track rail 1, respectively opposing each other, said no load zone consisting of a return hole 7 of a linear shape formed in said casing 2 parallel to said load track 6, and a direction changing path 8 which smoothly changes the direction of said roller 3 by connecting respectively the both ends of said return hole 7 and said load track 6.

(2) Description of the Prior Art

In order to allow rolling of said roller 3 in said no load zone, in the prior art the return hole provided in the casing 2 is of a shape having a square cross section which is slightly larger than the cross section at the axis of the roller 3, said roller 3 being of a cylindrical shape, the height and diameter thereof being approximately same, and usually said return hole is provided in the casing 2. However, due to the positional relationship with the load track 6, the inclination of the square cross-sectioned return hole has to be made at a certain angle. Thus the process of producing such an inclined hole became difficult, and also the lubrication for the rollers rolling inside the return hole was not always performed smoothly. As a result, in order to improve the lubrication it was necessary to form separate oil holes.

Also as examples of other prior art, as shown in FIGS. 7 through 9, proposals were made to facilitate easy processing of the return hole. However, any one of these had defects as described in the following.

In the example shown in FIG. 7, casing 21 is divided into two portions, namely, upper portion 22 and lower portion 23, at a location of return hole 20. However, for a return hole 20, having a certain inclination, the division into two portions becomes difficult, and at the time of assembly of the upper portion 22 and the lower portion 23, assembly error or positional misalignment may occur between the upper portion 22 and the lower portion 23. Thus, a precisely shaped return hole 20 could not be obtained, and cases occurred in which the roller did not roll smoothly. As a result, there was a problem to use such a roller bearing for endless linear motion.

In the example shown in FIG. 8, return hole 24 is formed by fastening a return cover 30 made of a thin plate at the outside of casing 29. This is a relatively simple construction. However, although it is possible to adopt in a special case when return hole 24 is provided at the bottom surface of casing 29, in the case when the return hole is provided at a side surface or at a top surface of casing 29, the selection of the fastening area of the return cover 30 is difficult and cannot be adopted, and thus there is no universality.

In the example shown in FIG. 9, a return path of no load zone is formed by a right angle V groove 26 in casing 25, and an upper bearing plate 27 and a lower bearing plate 28, both of which bearing over the upper and lower outside surfaces of roller 3 respectively in a sliding and a contacting manner. Although the construction is very simple, since portions of the side surface and the end surface of roller 3 are exposed, depending upon the installation place of the roller bearing for endless linear motion, there is a large possibility of entrance of foreign matters into the return path, and thus there was a defect of a great risk existing to become unable to provide a stable guide.

SUMMARY OF THE INVENTION

The present invention comprises a return hole of a roller bearing for endless linear motion wherein the cross section of the return hole consists of a concentrically shaped composite cross-section which is formed by a basic circular hole of the return hole and a guide hole of square cross section. Thus the return hole, which is a no load zone, maintains a minimum contact area with the roller and is able to secure an area for oil store, and since it is able to guide four corner portions of the roller at a cross section on the axis of the roller, it is possible to guide the roller smoothly with reduced resistance. The guiding of the rollers is also definite, and since there is formed oil store at four sides, it is possible to retain lubrication effect for a long period. The guiding surface of the roller can be very small, and since it is possible to exhaust foreign matters, there will be less occurrence of scores on the rolling surface of the roller in the return hole that was caused by entrance of foreign matters such as worn particles, etc. Also good cooling effect is produced against generated heat. As an overall result, the travelling resistance of the roller bearing for endless linear motion is made small, wear is made less, maintenance time is extremely reduced, and the life of the roller bearing is extended. Thus, it is possible to raise the operation efficiency of the machine on which said roller bearing for endless linear motion is installed. Further, from the standpoint of processing the return hole, it can be completed by two processes, namely, by a drilling operation of a basic circular hole which can be performed easily and precisely, and followed by a processing of right angle V grooves for the four corners by broaching, etc. which can be performed easily and accurately. As a result, the processing of a precise return hole is realized at low cost and the previously mentioned various effects are produced.

BRIEF DESCRIPTION OF THE ACCOMPANYING DRAWINGS

DETAILED DESCRIPTION OF THE EMBODIMENT

The present invention provides a return hole which can be located at an optional position inside a casing 2 without having the defects of any of the previously described prior arts. The construction of which will be described in the following with reference to the accompanying drawings.

Figure 1:
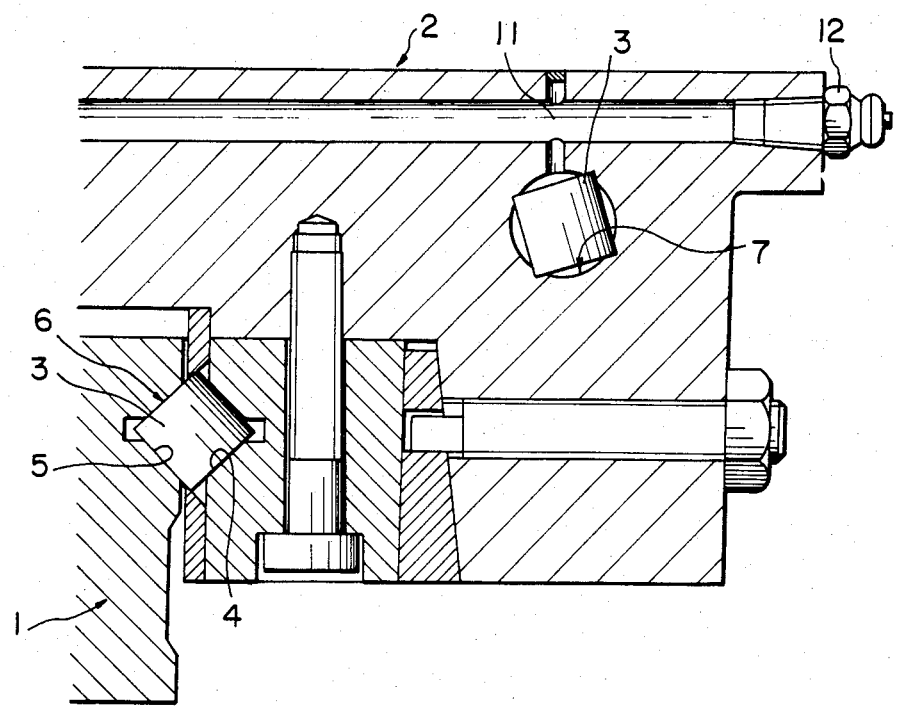
FIG. 1 is a partial elevational cross section of a roller bearing for endless linear motion incuding a cross sectional view of an embodiment of the present invention.
Figures 2, 3, 4:
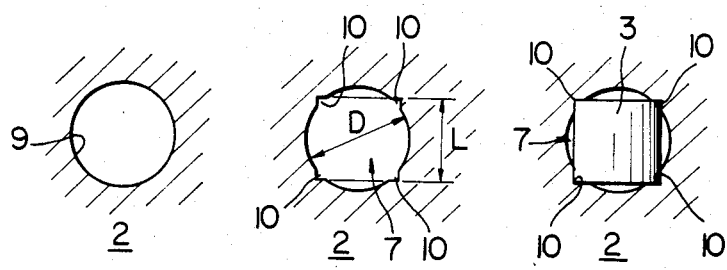
FIGS. 2 through 4 are partial cross sections illustrating a processing of a return hole of the present invention.
Figure 5:
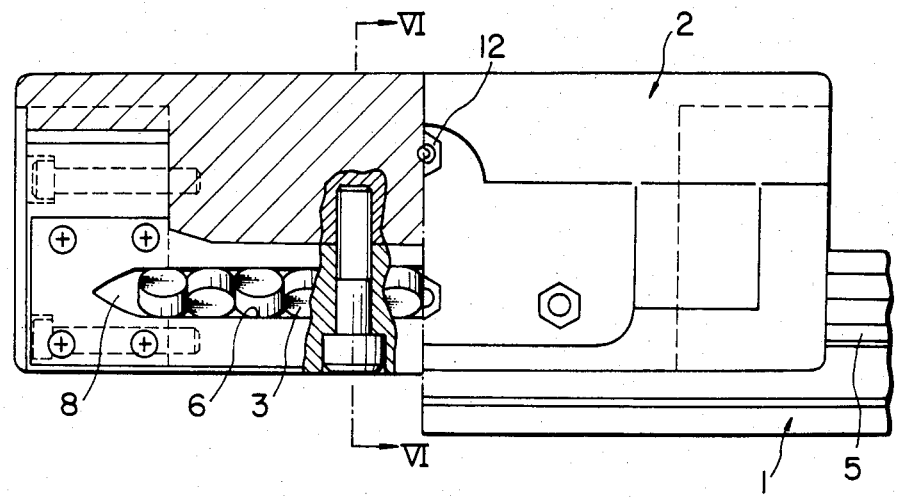
FIG. 5 is a side view of an embodiment of a roller bearing for endless linear motion with the left half portion being shown by a cross section taken along line V—V of FIG. 6.

As shown in FIGS. 1, 3, 4 and 6, return hole 7 is made inside a casing 2, and has a concentrically shaped composite cross section consisting of a circular cross section and a square cross section. Said concentrically shaped composite cross section is very easily made by first drilling a basic circular hole 9 of diameter D inside the casing 2 as shown in FIG. 2, and then, as shown in FIG. 3, by performing an operation such as broaching. As a result, right angle V grooves 10 are produced at four places which are portions of a square cross section having a side length L. Said side length L is slightly larger than the side length of a cross section taken along the axis of the roller.

As shown in FIG. 4, said right angle V grooves 10 form a guiding surface for the roller 3, and the portion of the basic circular hole 9 where the roller 3 is not in contact forms an oil store surface of the return hole 7.

When the diameter D of the basic circular hole 9 is gradually increased relative to L of the square cross section forming the guiding surface of the roller 3, the area of the right angle V groove 10, namely, the guiding area of the roller 3 decreases and the oil store area increases, thus, although lubrication characteristic is improved, even though it is a no load area, the guiding of the roller 3 becomes gradually unstable, and when it becomes $D=\sqrt{2}L$, namely, when the diameter becomes equal to the length of the diagonal of said square cross section, no right angle V groove will exist, and thus the guiding of the roller 3 will become impossible. Also since the edges of the end faces of the roller 3 are chamfered, when $D\simeq\sqrt{2}L$, it becomes even more impossible to guide. Therefore the range has to be $D<\sqrt{2}L$.

Also when the diameter D of the basic circular hole 9 is gradually decreased relative to L of the square cross section forming the guiding surface of the roller 3, although the area of the right angle V groove, and thus the guiding area of the roller 3 increases, the oil store area decreases and, as in the case of previously described prior art, lubrication characteristic decreases. When $D=L$, oil store area becomes zero. Thus it has to be in the range of $L<D$.

When coordinating the range of the diameter D of said basic circular hole 9, it becomes $L<D<\sqrt{2}L$. As a result of various experiments performed, it has been revealed that the range of $D=1.1\sim1.3L$ is desirable. By making the return hole 7 in this range, improvement in processing as well as in lubrication characteristic are obtained. Also, as shown in FIG. 1, by providing a communicating oil hole 11 above the return hole 7 inside the casing 2, it is possible to directly lubricate the roller 3 inside the return hole 7, and this also improves cooling effect inside the return hole 7 and also serves to exhaust foreign matters. The oil hole 11 is drilled at the cental portion of the casing 2 and a grease nipple 12 is provided at its outside end, and thus said foreign matters, etc. are exhausted towards the opening in the load zone side.

Figure 6:
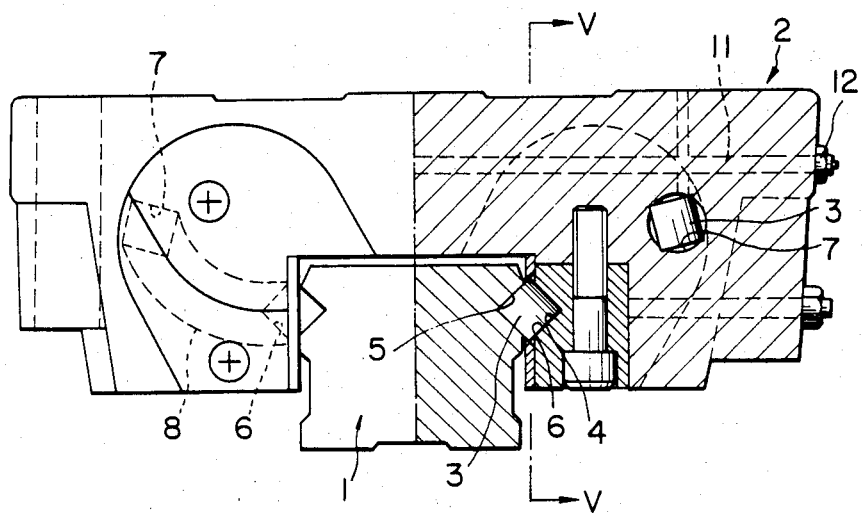
FIG. 6 is a front view of the above with the right half portion being shown by a cross section taken along line VI—VI of FIG. 5.
Figure 7:
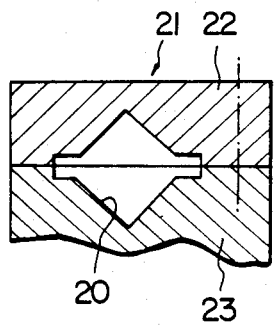
FIGS. 7 through 9 are partial cross-sectional views showing respectively prior art examples.
Figure 8:
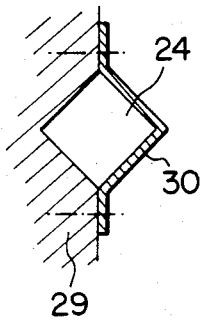
Figure 9:
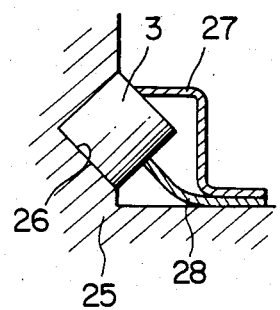
Figure 10:
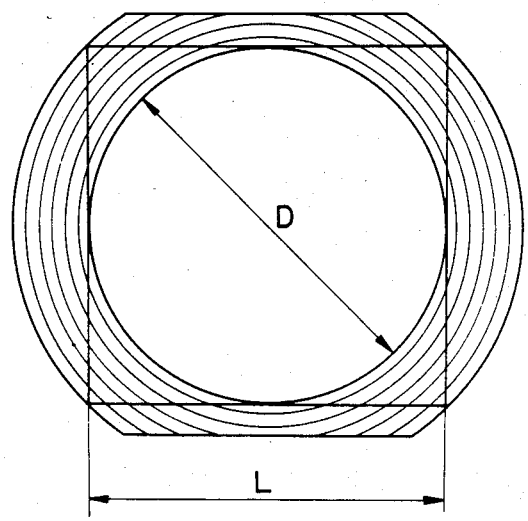
FIG. 10 is an illustrative drawing showing the relationship between a basic circular hole and a guiding hole.
Figure 11:
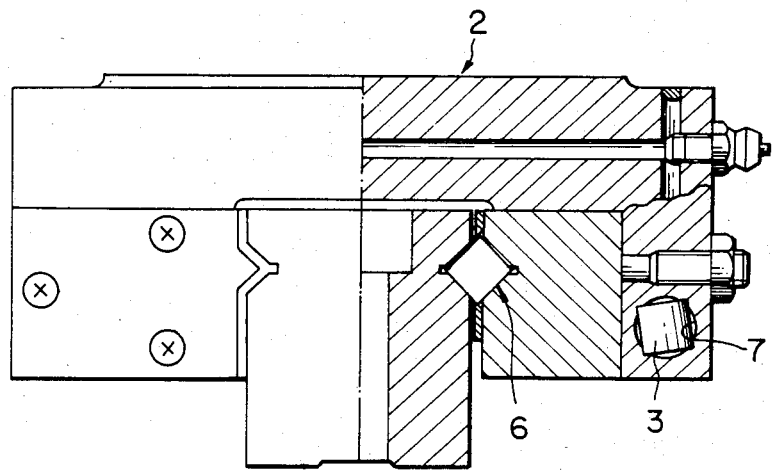
FIG. 11 is a front view of another embodiment showing the right half by a cross section.

Further, the positional relationship between the return hole 7 and the load track 6 can be in any manner such as, the return hole being located upwardly as shown in FIGS. 1 and 6, the return hole being located downwardly as shown in FIG. 11, or both the return hole 7 and the load track 6 being at a location of same level.

I claim:

1. A return hole of a roller bearing for an endless linear motion wherein a casing mounted on a track rail of a linear shape can make an endless linear motion through a plurality of rollers which circulate endlessly inside said casing, characterized in that the cross section taken perpendicular to the axial direction of a linearly shaped return hole provided inside said casing is formed by a concentrically shaped composite cross section consisting of a basic circular cross section and a square cross section, the diameter of said basic circular cross section being larger than the side length of said square cross section, and said return hole having a construction in which four right angle V grooves are formed on the periphery of said basic circular hole at even intervals and facing radially outwards.

2. The roller bearing of claim 1 wherein each of said grooves is formed by two substantially planar surfaces meeting at an angle of approximately ninety degrees.

3. The roller bearing of claim 1 wherein the peripheral surface of said no-load track is cylindrical in all areas other than said grooves.

4. The roller bearing of claim 3 wherein each of said grooves is formed by two substantially planar surfaces meeting at an angle of approximately ninety degrees.

5. The roller bearing of claim 1 wherein said housing includes a passage for supplying lubricant to said no-load track.

6. The roller bearing of claim 1 wherein said housing includes a passage for removing foreign matter from said no-load track.

7. The roller bearing of claim 1 wherein the shape of said no-load track in cross section is defined by a circle and square concentric therewith where the ratio of the diameter of said circle to a side of said square is between about 1.1:1 and 1.3:1.

8. The roller bearing of claim 7 wherein said housing includes a passage for supplying lubricant to said no-load track.

9. The roller bearing of claim 8 wherein said housing includes a passage for removing foreign matter from said no-load track.

10. The roller bearing of claim 1 wherein said bearing having a housing and a plurality of rollers which circulate endlessly in a circulatory path between a load track in contact with the rail and a no-load track out of contact with the rail, the improvement wherein said no-load track includes in cross section alternating (a) grooves for guiding said roller bearings and (b) grooves for storing lubricant.

* * * * *